March 30, 1937.  R. S. KELLEY  2,075,762
SEPARABLE INTERLOCKING FASTENER AND METHOD OF MAKING SAME
Filed July 10, 1933
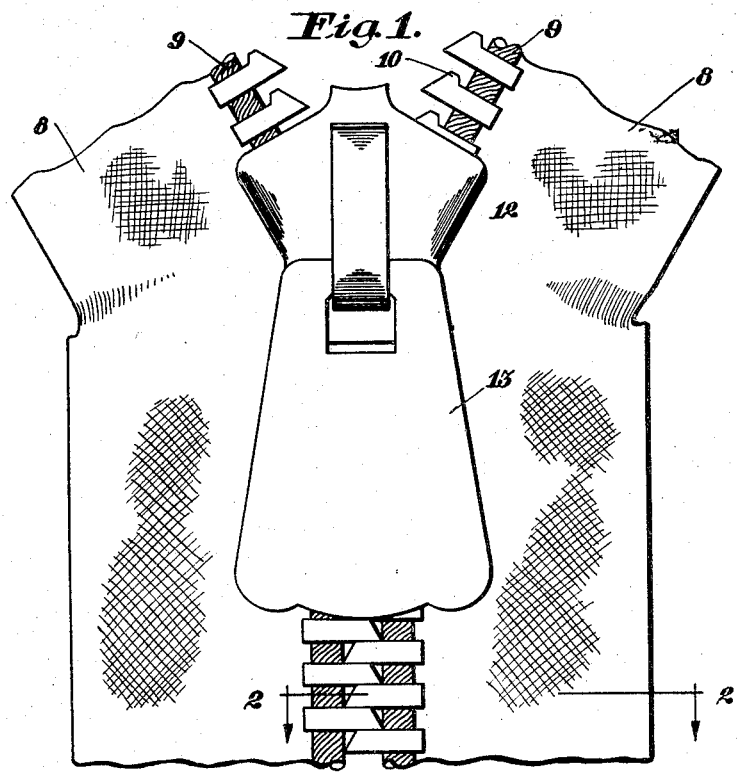
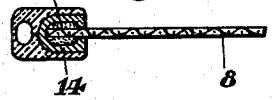
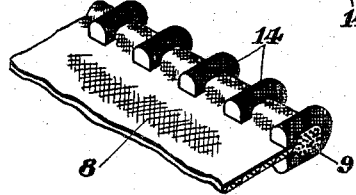
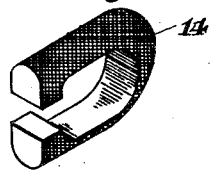
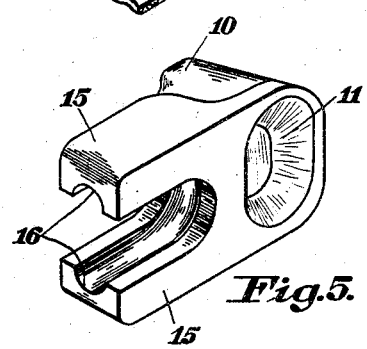
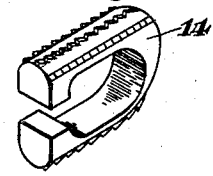
INVENTOR.
Roland S. Kelley
BY Kelley + Chisholm
ATTORNEYS.

Patented Mar. 30, 1937

2,075,762

UNITED STATES PATENT OFFICE 2,075,762

SEPARABLE INTERLOCKING FASTENER AND METHOD OF MAKING SAME

Roland S. Kelley, Meadville, Pa., assignor to Hookless Fastener Company, a corporation of Pennsylvania Application July 10, 1933, Serial No. 679,688

10 Claims. (Cl. 24—205)

This invention relates to separable interlocking fasteners and particularly to the attachment of the fastener members to their flexible supports.

Fastener members of a form similar to those used in known slide fasteners can be formed from non-metallic materials which have various advantages over slide fasteners with the usual metallic interlocking members. Some difficulty has been experienced in applying such members to the flexible supports, usually fabric tapes having beaded edges, since the machines and methods known for applying metallic fastener elements to the tapes have not been found useful in attaching non-metallic members to tapes.

It is accordingly the principal object of my invention to provide a novel form of attachment of the fastener members to the edges of flexible supports. More particularly my invention provides an intermediate means between the flexible support and fastener member which will grip and hold on the flexible support and at the same time, be so formed and shaped that it will receive and hold a fastener member made from non-metallic material. The material of the fastener member may be any of a wide range of plastics, for example, hard rubber, cellulosic products such as pyralin, and phenolic condensation products. Such materials in their rigid state are relatively unbendable as compared to metal. Some of them are somewhat flexible but can not be bent to a permanent shape as required for clamping directly to a yieldable member. The fastener members may be cut or molded to shape depending on the nature of the material. The shape of the interlocking head of the fastener may be varied to suit the requirements of the molding or cutting process, if desired.

In the accompanying drawing, I have shown for purposes of illustration, one embodiment which my invention may assume in practice. In this drawing:

Fig. 1 is a general view of a completed fastener with the ends broken away;

Fig. 2 is a cross-section of the fastener on line 2—2 of Fig. 1;

Fig. 3 is a perspective view of one of the intermediate members;

Fig. 4 is a perspective view showing the intermediate members attached to a flexible support or tape;

Fig. 5 is a perspective view of the non-metallic fastener member; and

Fig. 6 is a perspective view of a modified form of intermediate member.

In illustrating the invention I have adopted certain features now common in commercial slide fasteners. The flexible supports are in the form of fabric tapes 8 having beaded edges 9. The fastener members have interlocking means projecting from the beaded edge in the form of a projection 10 and recess 11. A slider 12 is manipulated by a pull 13 along the fastener members and progressively brings them into intermeshed and interlocked relation or separates them, depending on the direction of movement of the slider.

As illustrated there are attached along the beaded edges 9 of the tapes 8, a series of small metallic members, herein round wires 14, in uniformly and closely spaced relation. These wires are preferably shaped as indicated in Fig. 3 in order to engage firmly around the beaded edge of the tape and their outside surfaces are knurled or otherwise roughened. The elements 14 serve as bearing or supporting members to which the fastener members themselves are directly secured in the manner hereinafter described.

Referring to Fig. 5, the non-metallic fastener member has parallel gripping portions 15 which are preferably grooved as indicated at 16 to receive the U-shaped wire members 14 on the tape. The dimensions are preferably such that there is a very tight fit between the gripping portions and the wire members so that when the fastener members are pressed endwise on the wire members, they will be securely held in place. The roughened portions of the member will tend to dig in the non-metallic material and hold the member very securely against pulling off. To make a more effective connection, the outer surfaces may have barb-like ridges as shown in Fig. 6 which will permit the fastener member to be pressed on but will prevent its being pulled off the wire. Also on account of the grooved design the fastener member will be prevented from twisting on the wire.

As a result of my invention a fastener has been provided involving a combination of a stringer made of yielding fabric material with fastener elements of relatively unbendable plastic material, by having intermediate unyielding holding elements secured to the fabric stringer, which elements are mechanically connected rigidly to the fastener.

While I have shown and described in this application one embodiment which my invention may assume in practice, it will be understood that the foregoing description and illustration are merely for the purposes of explanation and various other forms will occur to those skilled in the art.

What I claim as my invention is:

1. A separable interlocking fastener of the class described including a flexible tape, a series of holding elements consisting of metallic members clamped on the edge of said tape in uniformly and closely spaced relation, and fastener members of relatively unbendable rigid plastic material each having attaching portions rigidly secured to said metallic members to hold the fastener members firmly in position.

2. A separable interlocking fastener of the class described including a flexible tape, a series of holding elements consisting of U-shaped wire members in uniformly and closely spaced relation on the edge of said tape, and fastener members of relatively unbendable rigid plastic material each having a bifurcated portion embracing and rigidly secured to said wire members.

3. A separable interlocking fastener of the class described including a flexible tape, holding elements consisting of U-shaped wire members attached in uniformly and closely spaced relation on the edge of said tape, each of said wire members having roughened outer surfaces, and fastener members of relatively unbendable rigid plastic material each having parallel gripping portions, said gripping portions being grooved and fitting tightly over the roughened outer surfaces of said holding elements to secure said fastener members rigidly to said holding elements.

4. A separable interlocking fastener of the class described including a yielding fabric tape, a series of intermediate unyielding holding elements secured firmly on the edge of said tape in spaced relation, and fastener members of relatively unbendable rigid plastic material mechanically connected rigidly to said holding elements whereby said fastener members are indirectly and firmly held on said fabric tape.

5. A separable interlocking fastener of the class described comprising a flexible support having an edge of yieldable material, a series of intermediate unyielding holding elements of rigid material secured firmly to said edge in uniformly spaced relation, and a series of fastener members of relatively unbendable rigid plastic material each having spaced attaching arms which mechanically grip around one of said holding elements.

6. The method of making separable interlocking fasteners of the class described, which comprises securing firmly to the edge of a yielding fabric stringer a series of unyielding holding elements of rigid material, and then mechanically connecting the fastener members consisting of rigid plastic material to said holding elements.

7. A separable interlocking fastener of the class described including a flexible carrier, non-metallic fastener members arranged in uniformly and closely spaced relation along the edge of the carrier, each fastener member having an interlocking portion and a pair of spaced parallel arms, and a separate supporting member mounted between the arms of each fastener member, said supporting member being mechanically interlocked with the fastener member and having a pair of parallel arms defining a slot receiving the carrier and means adapted to prevent removal of the carrier from the slot.

8. A separable interlocking fastener of the class described, comprising in combination a pair of flexible tapes, bearing members firmly secured to the edges of said tapes at spaced intervals thereon, and interlocking fastener members one on each of said bearing members, said fastener members being rigidly secured to said bearing members.

9. A separable interlocking fastener of the class described, comprising in combination a pair of flexible tapes, U-shaped bearing members firmly secured to the edges of said tapes at spaced intervals thereon, and interlocking fastener members one on each of said U-shaped bearing members, said fastener members being rigidly secured to said U-shaped bearing members.

10. A separable interlocking fastener of the class described including a flexible carrier, non-metallic fastener members arranged in uniformly and closely spaced relation along the edge of the carrier, each fastener member having an interlocking portion and a pair of spaced parallel arms, and a separate supporting member mounted between the arms of each fastener member, said supporting member being rigidly united with the fastener member and having a pair of parallel arms defining a slot receiving the carrier, and means adapted to prevent removal of the carrier from the slot.

ROLAND S. KELLEY.